March 8, 1955 D. J. LORUSSO Re. 23,960

ANTENNA SYSTEM FOR TELEVISION

Original Filed May 12, 1950 2 Sheets-Sheet 1

INVENTOR.
Daniel J. Lorusso
BY Owen W. Kennedy
ATTORNEY

ANTENNA SYSTEM FOR TELEVISION

Original Filed May 12, 1950 2 Sheets-Sheet 2

INVENTOR
DANIEL J. LORUSSO
BY Oran W. Kennedy
ATTORNEY

United States Patent Office

Re. 23,960
Reissued Mar. 8, 1955

23,960

ANTENNA SYSTEM FOR TELEVISION

Daniel J. Lorusso, Westboro, Mass., assignor of fifty per cent to Norman S. Blodgett, Westboro, Mass.

Original No. 2,572,166, dated October 23, 1951, Serial No. 161,662, May 12, 1950. Application for reissue October 16, 1952, Serial No. 315,220

5 Claims. (Cl. 250—33.57)

Matter enclosed in heavy brackets [ ] appears in the original patent but forms no part of this reissue specification; matter printed in italics indicates the additions made by reissue.

The present invention relates to antenna systems and is particularly directed to an improved antenna for the reception of signals of frequencies associated with television broadcasting. It is the primary object of the present invention to provide an antenna which is designed for high gain unidirectional performance throughout all of the presently designated television channels.

When considering the general problem of high gain performance, the efficiency of a conventional dipole antenna is well understood, as is its action at frequencies other than for which it is designed. Briefly, a simple dipole designed for one frequency will operate at reduced efficiency when operated at differing frequencies. In the event of higher frequencies, the loss of effectiveness is due to flattening out of the radiation lobes so that although more wire or metal is being energized, the effective radiation of the antenna in any one direction is less. As a result, a fairly uniform response is achieved over a frequency range only wide enough to reasonably cover one television channel with a width of six megacycles.

The conventional folded dipole antenna is well known to have higher efficiency over a wider range than the simple dipole noted above, as the folded dipole possesses a fairly uniform response across a range of frequencies wide enough to reasonably cover four television channels, with a range of twenty-four megacycles. Such a folded dipole antenna, however, [fails] *falls* far short of offering a full solution to the problem, since it is incapable of operation over the entire twelve television channels with a range of from 54 to 216 megacycles. If a *conventional* folded dipole is operated at frequencies beyond its range, it will result in flattening out the radiation lobes, so that the effective radiation in any one direction would be less.

[The present invention provides a bat wing-shaped dipole antenna of continuous conducting material forming a complete electrical circuit,] *One feature of my invention is an improved folded dipole driven element of substantially bat wing shape, preferably* with the front portion of the dipole concaved towards the front of the antenna, while two rear portions of the dipole are bent inward [away] *and rearwardly* from the front portion to obtain varied spacing between the front and rear portions, so that the *band width is broadened and* flattening of the lobes is prevented, and so as to render the center impedance substantially constant. All the energy becomes substantially additive and in phase, with the lobe sharpening effect remaining in line for a considerable frequency range. [The antenna] *Such a driven element* is cut to a one-half wave length for a [given] *selected* channel in the lower frequency range, for example channel 3 at 61 megacycles, so that at higher frequencies it [becomes continuously more effective than a half wave until, at the highest channel frequency to be received, it may function as a two full wave] *may function, by virtue of its length, as a multiple half wave* antenna with practically the same in-line pattern as at lower frequencies. Accordingly, voltage derived at such higher frequencies is more effective.

The frequency response over the entire twelve television channels is increased, when two bat wing-shaped dipoles of the above described type are used in the form of an X, so more wire will be energized and more energy will be transferred to the transmission line.

*My invention also involves an antenna system or array using parasitic reflector and director elements, but with the director or directors cut or proportioned, not as heretofore to the driven element's length, but instead to a one half wave length for a selected channel in the higher frequency range, thereby sharpening the system's responsiveness to said selected channel while still leaving said driven element sufficiently exposed for satisfactory reception of all other channel frequencies.*

The above and other advantageous features of the present invention will hereinafter more fully appear from the following description considered in connection with the accompanying drawings, in which, Fig. 1 is a perspective view of my improved antenna system as it appears when looking upwardly from beneath the supporting mast.

Figure 1:
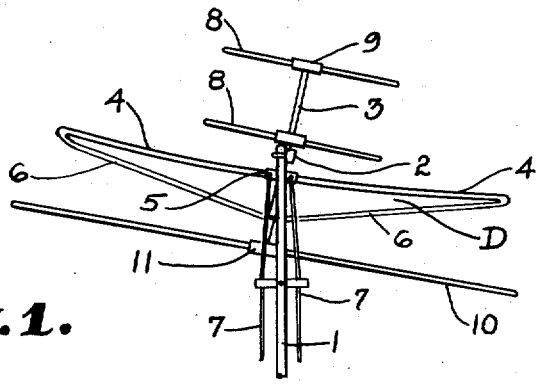

Referring first to Fig. 1, the antenna array or system is shown as being mounted at the top of a mast 1, which provides a suitable fitting 2 for supporting a cross bar 3 extending at right angles to the vertical axis of the mast 1. It is to be noted that the cross bar 3 is substantially horizontal, and extends both forwardly and rearwardly from the mast 1, so as to support the several elements of the antenna system in the same plane. The fitting 2 is adjusted on the mast 1 so that the cross bar 3 points generally in the direction of the station, or stations, from which it is desired to receive signals.

Figure 2:
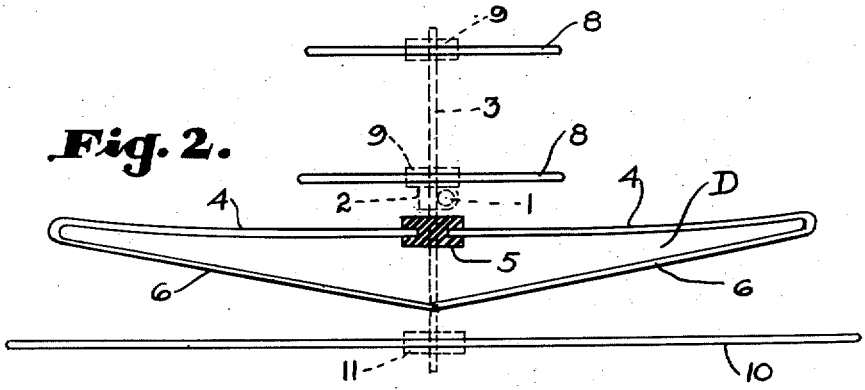
Fig. 2 is a plan view of the antenna system shown in Fig. 1, on an enlarged scale.

As best shown in Fig. 2, the driven element of the antenna system, as indicated by the reference character D, is composed of tubular conducting material [in the form of a bat wing-shaped dipole providing a complete electrical circuit, with the front portions 4 connected at their ends to an insulating plate 5 mounted on the bar 3.] *bent to approximate bat wing shape, to provide two opposed V-shaped structures whose substantially alined front arms 4, 4 have their inner ends connected, at an insulating plate 5 on bar 3, with the respective lead-in wires 7, 7 of a transmission line.* It is to be noted that the portions 4 are *slightly* concave toward the front of the antenna, [in the direction from which signals are received, so that the effects of flattening of the radiation lobes is prevented, as will later appear. The two rear portions 6 of the dipole D are bent] *to tilt the dipole into the wavefront, as is commonly done in this art. The rear arms 6, 6 of the V-shaped structures are conductively connected together and slant rearwardly* away from the front portions 4 to obtain a varied spacing between the portions 4 and 6, which spacing has the effect of broadening the band width and of obtaining a center impedance characteristic that will match a conventional 300 ohm transmission line of which the lead-in wires 7 form a part.

The antenna system also consists of tubular metallic directors 8 mounted on the front end of the crossbar 3 by fittings 9, with the directors extending in spaced parallel relation. The directors 8 are of substantially equal lengths, and, [as shown,] *according to my invention,* the directors 8 are cut to a one-half wave length for [a given] *any selected* channel in the higher frequency range, for example channel 7 at 177 megacycles, and are approximately one-third the length of the dipole D, which as previously noted is cut for a one-half wave length at 61 megacycles. When directors are used at frequencies higher than channel 7, they will be shorter making them somewhat less than one-third the length of dipole D.

The antenna system also includes a tubular metallic reflector 10 supported on the bar 3 by a fitting 11, with the reflector extending parallel to the directors 8, and facing the inclined legs 6 of the driven element D, which

[points] *converge* in the direction of the reflector 10. The length of the reflector 10 is slightly greater than the over-all length of the driven element D, [and the above noted general relation between the lengths of the parts of the antenna system is of very great importance in making it possible for the single driven element D, to pick up both high and low frequency broadcasts falling within the presently designated television channels.]

[As previously pointed out, the antenna shown in Fig. 2 is drawn to scale on the basis of calculations which take into account the range of frequencies employed for television, and frequency modulation broadcasting, as outlined above. In other words, there exists a very definite relation between the length of the driven element D, and the reflector 10, as compared to the lengths of the directors 8, and there will next be considered the basis on which these relative lengths are determined in order to obtain satisfactory reception from separate channels chosen from both the low and high frequency groups.]

[For example, let it be assumed that for purposes of illustration, it is desired to have the antenna of Fig. 2 tuned to receive broadcasts] *in accordance with ordinary practice in the art.*

*Fig. 2 is drawn to scale, to exemplify an antenna system or array which is constructed and proportioned, according to my invention, for the most favorable reception of telecasts coming* from channel No. 3 having a frequency of from 60 to 66 megacycles, in the low frequency range, as well as from channel No. 7 having a frequency of from 174 to 180 megacycles, in the high frequency range. To meet this condition, the length of the directors 8 will be made to substantially correspond with a one-half wave length for channel No. 7, at 177 megacycles, which is approximately 30 inches, while the length of the driven element D will be made to [correspond] *correspond* with a one-half wave length for channel No. 3, at 61 megacycles, which is approximately 90 inches. In other words, the ratio between the lengths of the driven element D and a director 8 is substantially 3 to 1, which ratio is substantially the ratio that exists between the highest frequency in channel No. 7, at 180 megacycles, and the lowest frequency in channel No. 3, at 60 megacycles. As previously noted, the length of the reflector 10 is slightly greater than the length of the driven element D, so that the reflector 10 will have a length of approximately 100 inches for the antenna system shown in Fig. 2.

The spacing between the parts of the antenna system along the cross bar 3 is also of some importance, and with the particular arrangement shown in Fig. 2, it has been found that best results are obtained with a spacing of 8 inches between the driven element D and the nearest director 8, and a spacing of 18 inches between the *front of* driven element D and the reflector 10. When two directors 8 are employed, they should be spaced apart a distance of 15 inches, which is substantially one-half the length of each director.

The specific [frequencies] *examples* given above for the relative lengths and spacing between the parts of the antenna system, shown in Fig. 2, are illustrative of the way in which the [driven element D is] *respective driven and parasitic elements are* laid out to obtain the best results for the reception of television broadcasts coming in from separate stations assigned to different channels in both the high frequency and low frequency ranges. Obviously, the exact proportions of the driven element D, with reference to the directors 8 and the reflector 10 can be varied, as required, to best tune the driven element D for receiving broadcasts from other channels, without departing from the underlying [principle] *principles* of the present invention, [namely the utilization of a single driven element of bat wing form.] *as particularly specified in the appended claims.*

Figure 3:
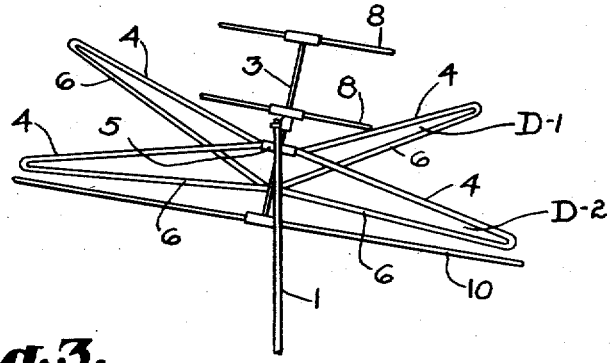
Fig. 3 is a perspective view similar to Fig. 1, and illustrating a modification of the invention.

As previously pointed out, all of the members entering into the antenna system shown in Figs. 1 and 2, lie in a horizontal plane, and it has been found that this particular arrangement is satisfactory to meet most of the conditions outlined above, with regard to receiving broadcasts [for] *from* channels in both the high frequency and low frequency ranges. However, in order to increase the distance range and sensitivity of the antenna to frequencies at opposite ends of the entire television band, it has been found desirable in some cases to employ two driven elements in parallel. Such a modified arrangement, is shown in Fig. 3 wherein a pair of bat wing driven elements D–1 and D–2 are mounted on the fitting 5 with their bases and legs bent in opposite directions with respect to the cross bar 3. In this modified arrangement, the driven elements D–1 and D–2 are identical with the driven elements D of Fig. 1 to the extent of each being in the form of a bat wing, with the elements D–1 and D–2 being additionally bent so that [the bases 4 and legs 6 thereof] *their opposed V-shaped structures* extend away from the cross bar in four different directions, thereby increasing the amount of energy that will be transferred to the transmission line. It has been found that the modified antenna system of Fig. 3 will respond to an extremely wide range of frequencies when the two driven elements D–1 and D–2 are connected in parallel, and coupled to a television receiving set by the lead-in wires 7 of the transmission line.

Figure 4:
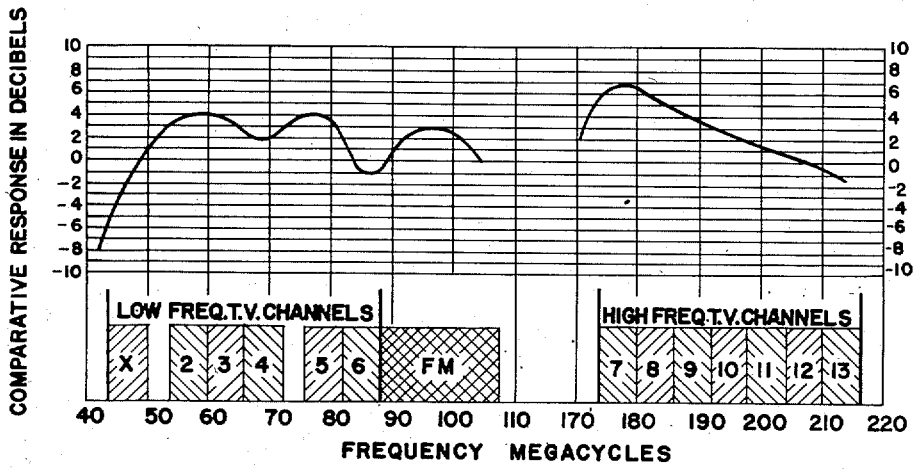
Fig. 4 is a chart illustrating the frequency response in decibels across the entire range of twelve television channels obtained by utilizing my improved antenna, as shown in Fig. 1.

[From the foregoing, it is apparent that by the present invention, there is provided an improved antenna array or system, characterized by the utilization of a bat wing driven element, so proportioned and disposed in such relation to a director and a reflector, that it will resonate at both the higher frequencies and the lower frequencies presently employed in television broadcasts.] It has been found by actual tests that my improved antenna gives high gain unidirectional performance over the entire range of frequencies as presently employed for television channels. Fig. 4 graphically shows the frequency response obtained by my antenna, expressed in terms of decibel gain, across the entire low and high frequency range of television channels extending from 54 to 216 megacycles. In this chart, the vertical ordinates represent decibels plotted against the horizontal ordinates which represent the frequencies of the various television channels. It is to be noted in Fig. 4 that the maximum response at 177 megacycles in channel 7 is the result of cutting the directors 8 to a one-half wave length at this particular frequency.

Figure 5:
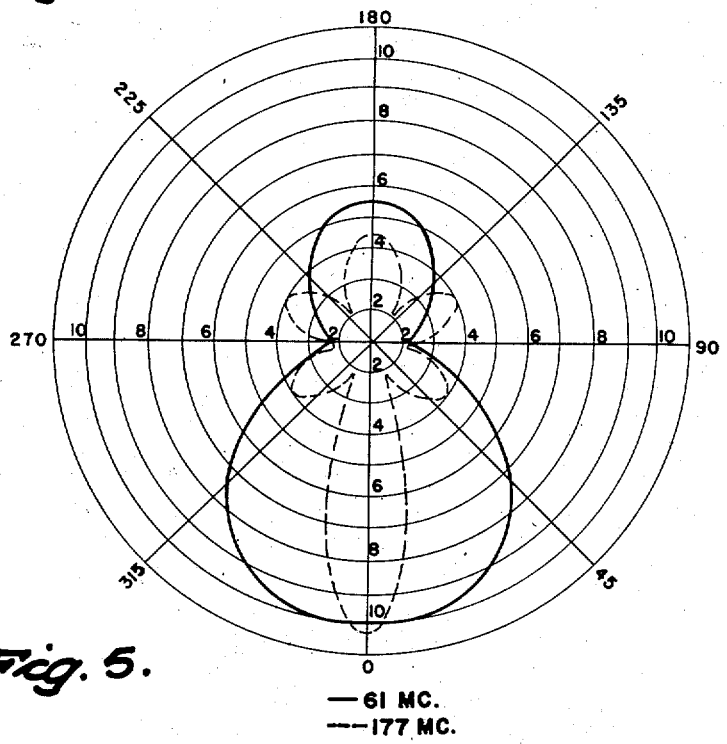
Fig. 5 is a diagrammatic illustration of the field or lobe pattern obtained by my antenna at widely differing frequencies.

Fig. 5 graphically shows the field or lobe pattern obtained by the use of my antenna at two widely different frequencies, such as are represented by channels 3 and 7, respectively. The dotted line pattern of Fig. 5 illustrates the extreme sharpening of the lobes which results from cutting the directors 8 to match the frequency of 177 megacycles of channel 7, while the full line pattern shows the response of the antenna at the 61 megacycles of channel 3. It has also been found that the lobes of the full line pattern at frequencies that are not affected by the directors 8 can be sharpened by increasing the degree of concavity of the front portions 4 of the driven element. Therefore, it will be apparent from a consideration of Figs. 4 and 5, that my antenna is particularly adapted to give high gain performances that will be superior as compared to an antenna employing either a simple dipole or a *conventional* folded dipole as a driven element, either of which elements are definitely limited in the number of television channels over which they will resonate. By utilizing my antenna the necessity of installing separate antennas for receiving signals at the higher and lower frequencies is eliminated.

[In other words, my invention resides in providing a single bat wing shaped dipole that will] *My invention enables a single dipole or driven element to* function throughout all of the twelve television channels, without the need of using two separate folded dipoles, one longer dipole for the low frequency channels, and one shorter dipole for the high frequency channels, which would require a phasing or connecting section, and possibly a quarter-wave matching section, to electrically connect both dipoles together. In my antenna, the center impedance of my dipole will match a conventional 300 ohm twin lead transmission line without the need of resorting to quarter wave sections or other matching devices. The importance of this feature is readily apparent when it is remembered that conventional receivers, as now manufactured, are almost invariably matched to a 300 ohm line, and the use of any type of matching section between the line and the antenna necessarily causes the circuit to become frequency sensitive and thus nullifies any broad band characteristics that the antenna itself might possess.

Coming now to the performance of the directors, it is well known that parasitic directors at resonant frequency will absorb transmitted power and reradiate with such a phase relationship that the reradiated signal adds to the original transmitted signal. Then the dipole will be able to gather useful energy both from the original wave and from the reradiated wave which is sent out by the directors.

The conventional dipole, or folded dipole with parasitic directors all of [approximate equal lengths,] *approximately the same length as said dipole,* is commonly known as a Yagi antenna, and has a high gain at only a very narrow band of frequencies, with the result that a fairly uniform response is achieved *only* wide enough to [reasonably] *satisfactorily* cover one television channel with a maximum width of six megacycles.

If the Yagi antenna is operated at frequencies other than what it is designed for it would be practically nullified, because the dipole being approximately the same length as the directors, will operate only at frequencies that the directors are designed for, as directors have a narrow band width and will function to cover one channel only.

In providing the antenna of the present invention, I have further improved the application of parasitic directors, by making the lengths of such directors one-third or less than the length of the dipole. As a result, the dipole will have two-thirds or more exposed area that cannot be nullified by the directors when [operated] *operating* at frequencies other than the frequencies to which the directors are cut. The directors as used, are cut to half wave *length* of any one selected channel of the high frequency channels, [while the bat wing-shaped dipole operates at one and one-half wave lengths at the lower end of the high frequency channels until, at the highest channel frequency to be received, it may function at two full wave lengths.] *and when receiving at the frequency of this selected channel, the driven element, by reason of its much greater length, functions as a multiple half wave length element.*

The directors will increase the efficiency considerably of any one selected channel of the seven high frequency television channels, *it being understood that, in most cases, the channel so selected would be the weakest of any two or more of the higher frequency channels that are within the operating range of the television receiver's location.* [It is understood that directors are used to increase the efficiency of one channel only, for example if operated to receive high frequency channels 7, 10 and 13, and if channel 7 was weak, the directors would be cut half wave to channel 7, or if channel 13 was weak instead of channel 7, then the directors would be cut to half wave to channel 13.]

I claim:

1. An antenna for the reception of signals of frequencies associated with television broadcasting comprising a dipole element providing a continuous conductor bent to form two opposed V-shaped structures, each in a plane, one end of an arm of each V being connected to a corresponding terminal of a transmission line, and with the ends of the other arms of the V's being conductively connected together, the arms connected to the transmission line being concave towards the other arms to prevent flattening of said element's lobe pattern, while the varied spacing between the arms of each structure serves to broaden the band width and to keep the characteristic center impedance of a 300 ohm transmission line, and with the length of said element corresponding to a one-half wave length of a frequency at the lower end of a channel range which is to be accommodated.

2. An antenna comprising a pair of dipole elements constructed in accordance with claim 1, in which the planes of the opposed V's of each element are at an obtuse angle to each other to provide an X-shaped structure, with the ends of the concaved arms of the V's being connected in parallel relation to corresponding terminals of the transmission line and with the ends of the other arms of the V's being conductively connected together at a common point.

3. An antenna for the reception of signals of frequencies associated with television broadcasting comprising a dipole element providing a continuous conductor bent to form two opposed V-shaped structures, each in a plane, one end of an arm of each V being connected to a corresponding terminal of a transmission line and with the ends of the other arms of the V's being conductively connected together, with the varied spacing between the arms of each structure serving to broaden the band width and to keep the characteristic center impedance of a 300 ohm transmission line, and with the length of said element corresponding to a one-half wave length of a frequency at the lower end of a channel range which is to be accommodated, in combination with a straight director spaced from the arms of said V's which are connected to the transmission line, with said director cut to a length which is not more than one-third the over-all length of said dipole element, so that the said director improves the sensitivity of said element at said director's resonant frequency, while leaving at least two-thirds of said element exposed that cannot be nullified by said director when said element is operating at a frequency other than the frequency to which said director is cut.

*4. An antenna as recited in claim 1 wherein is provided a reflector element spaced from the dipole element, and a director element spaced from the dipole element at the side thereof away from the reflector element.*

*5. An antenna for the reception of signals of both a first band of frequencies and a second band of frequencies associated with television broadcasting, the said bands being substantially separated, comprising a driven element of the dipole type adapted to be included in an electrical circuit with a transmission line and a receiving set, said driven element having a length corresponding to a one-half wave length for a selected channel in the first band of frequencies, in combination with a single associated parasitic direction means, outside of said circuit, said director means consisting of at least one director element cut in every case to substantially a one-half wave length for any selected channel in the second band of frequencies, whereby in every case, due to the wide separation between the two groups of wave lengths for the respective first and second bands of frequencies, there is left exposed beyond the director element ends approximately two-thirds or more of the length of the driven element.*

References Cited in the file of this patent or the original patent

UNITED STATES PATENTS

| | | |
|---|---|---|
| Re. 23,273 | Kearse | Sept. 26, 1950 |
| 1,745,342 | Yagi | Jan. 28, 1930 |
| 2,131,108 | Lindenblad | Sept. 27, 1938 |
| 2,175,253 | Carter | Oct. 10, 1939 |
| 2,199,050 | Jenkins | Apr. 30, 1940 |
| 2,207,504 | Bohm | July 9, 1940 |
| 2,268,640 | Brown | Jan. 6, 1942 |
| 2,436,843 | Watts, Jr. et al. | Mar. 2, 1948 |
| 2,452,073 | Schivley et al. | Oct. 26, 1948 |

FOREIGN PATENTS

| | | |
|---|---|---|
| 883,548 | France | Mar. 29, 1943 |